United States Patent [19]

Newberry

[11] 4,288,084
[45] Sep. 8, 1981

[54] CHUCK COLLAR

[76] Inventor: Robert H. Newberry, 4502 Havre Way, Pensacola, Fla. 32505

[21] Appl. No.: 82,285

[22] Filed: Oct. 5, 1979

[51] Int. Cl.³ .............................................. B23B 31/06
[52] U.S. Cl. .................................... 279/60; 81/90 A; 279/1 K; 279/62
[58] Field of Search .................... 279/1 K, 60, 61, 62; 81/90 A

[56] References Cited

U.S. PATENT DOCUMENTS

| 2,451,565 | 10/1948 | Landon | 279/1 R |
| 3,861,693 | 1/1975 | Huber | 279/61 |
| 4,095,811 | 6/1978 | Cohen | 279/1 K |
| 4,097,054 | 6/1978 | Derbyshire | 279/60 X |

FOREIGN PATENT DOCUMENTS

| 416329 | 11/1946 | Italy | 279/60 |
| 506151 | 11/1954 | Italy | |
| 960409 | 3/1957 | Fed. Rep. of Germany | |

Primary Examiner—Z. R. Bilinsky
Attorney, Agent, or Firm—Sixbey, Friedman & Leedom

[57] ABSTRACT

A tubular chuck collar with a plurality of teeth circumferentially arranged around the base thereof to form a toothed track is fitted over the inner cylinder of a conventional chuck assembly in spaced relationship to the outer cylinder of the chuck assembly such that the toothed track of the chuck collar opposes the conventional toothed track on the outer cylinder. A securing means releasably secures the collar to the inner cylinder. The toothed track of the chuck collar includes at least one section oriented at an incline relative to the toothed track on the outer cylinder, whereby a bladed instrument such as a screwdriver may be inserted into the gap between the collar and the outer cylinder to simultaneously engage the teeth in both toothed tracks. The screwdriver so inserted is twisted about its longitudinal axis to simultaneously apply opposing torques to the collar and the outer cylinder. The torque on the collar is transferred through the securing means to the inner cylinder, which is caused to rotate relative to the outer cylinder to open or close the chuck jaws as desired. The chuck collar also includes a slot formed in the side thereof in alignment with one of the conventional chuck key pivot holes in the inner cylinder. A conventional chuck key may be inserted into the pivot hole to engage the teeth in the toothed track on the outer cylinder, and may thereafter be used to operate the chuck jaws in a conventional manner.

18 Claims, 6 Drawing Figures

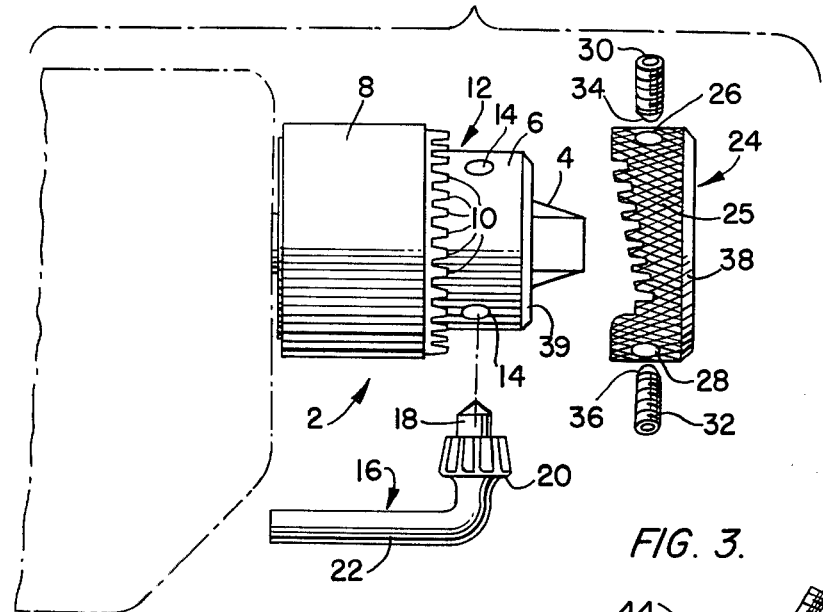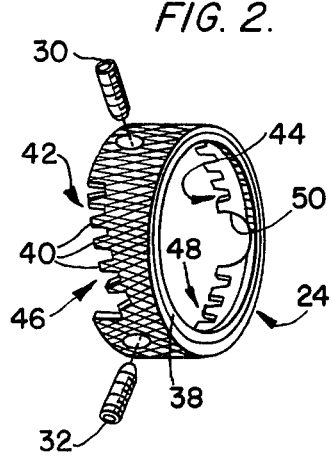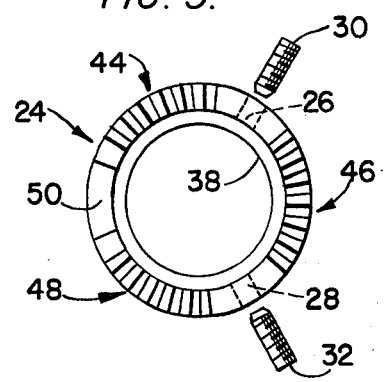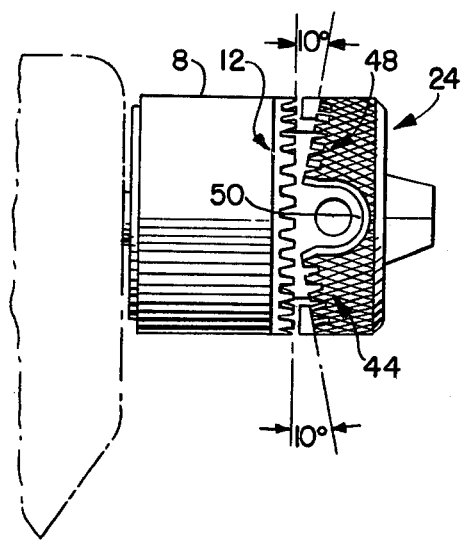

CHUCK COLLAR

TECHNICAL FIELD

This invention relates to drill chucks capable of releasably holding interchangable drill bits and more particularly to an improved means for opening or closing the jaws of a drill chuck without the use of a conventional chuck operating key.

BACKGROUND ART

It has previously been recognized that conventional chuck keys are easy to lose, or frequently become separated from their associated chucks. When a chuck key is thus unavailable, it becomes difficult or impossible to operate the chuck and replace the drill bit or other cutting tool held therein.

Earlier attempts to address the problem of lost or misplaced chuck keys have resulted in the invention of various devices designed to allow a drill operator to open or close the jaws of a conventional chuck by means of a tool other than a chuck key. One such device is disclosed in U.S. Pat. No. 2,451,565, issued to Landow on Oct. 19, 1948. The Landow chuck adapter includes a tubular member which fits tightly over the lower portion of the chuck body and is secured thereto by means of a screw inserted radially through a threaded bore in the tubular member. The screw is designed to engage one of the radial bores which are disposed about the lower portion of the chuck body for the purpose of receiving the pin of a conventional chuck key. A bevel gear rotatably mounted within an interior recess on the tubular member engages the teeth cut in the outer cylinder of the chuck, and a shaft protrudes from one end of the bevel gear to form a hub on the outer surface of the tubular member. A suitable tool such as a hexagon key may be inserted into the hub and used to turn the bevel gear, thereby rotating the outer chuck cylinder relative to the inner portion of the chuck in the same manner as if the teeth on the outer chuck cylinder were engaged by a conventional chuck key.

The Landow adapter, although providing a solution to the problem of manipulating chuck jaws without a chuck key, nevertheless contains several inherently objectionable features. The presence of the hub on the outer surface of the tubular member creates an annoying and potentially dangerous obstacle to the user when the drill is rotating during operation. Moreover, the hub itself must either be relatively small in dimension, rendering it difficult to maintain a torque on the hub sufficient to open a tightly clamped jaw, or must be of such size and weight as to throw the chuck assembly out of balance. The Landow adapter thus fails to provide a practical answer to the problem of lost chuck keys.

A second type of chuck jaw operating and closing device is disclosed in U.S. Pat. No. 4,095,811, issued to Cohen on June 20, 1978. The Cohen device utilizes a friction-fitting drive sleeve which is placed over the outer chuck cylinder and an anchor ring which is placed over the inner chuck cylinder. Studs formed on the inner surface of the anchor ring engage the chuck key pivot holes formed in the chuck inner cylinder. The drill operator grips the drive sleeve in one hand and the anchor ring in the other hand. The anchor ring and drive sleeve are then twisted in opposite directions, causing the chuck outer cylinder to rotate relative to the chuck inner cylinder to lock or unlock the chuck jaws as desired. The primary disadvantage of the Cohen device lies in the fact that the torque applied to the chuck cylinders in locking or unlocking the jaws is limited by the strength of the operator's grip on the drive sleeve and the anchor ring. There is no provision in Cohen for applying any mechanical leverage to assist in operating the chuck.

The prior art also discloses several other types of specialized chuck keys. German Pat. No. 960,409, for example, issued to Gebhardt on Mar. 21, 1957, discloses a chuck assembly comprising an outer cylinder having a toothed shoulder and a cylindrical member mounted on the chuck assembly to operate the chuck jaws when rotated relative to the outer cylinder. One end of the cylindrical member is spaced a short distance from the toothed shoulder of the outer cylinder to form a channel around the periphery of the chuck assembly. Beveled teeth resembling the teeth on the outer cylinder are circumferentially cut in the end of the cylindrical member spaced from the outer cylinder, and together with the toothed shoulder of the outer cylinder form two opposing tracks of teeth in the sides of the channel. A chuck key containing a bevel gear is inserted into the channel, causing the teeth of the bevel gear to simultaneously engage the teeth on both of the opposing tracks. When the chuck key is thereafter twisted, the cylindrical member rotates relative to the outer cylinder to operate the chuck jaw mechanism while the key travels in an opposite direction along the channel formed around the periphery of the chuck. Italian Pat. No. 506,151, issued to Pagano on Nov. 21, 1954, discloses a similar type of chuck assembly. Neither the patent to Gebhardt nor the patent to Pagano, however, teaches an efficient or practical means for opening or closing the jaws of a chuck without the use of a chuck key, wherein the means can be easily attached to existing chuck assemblies of the type employing only a single toothed outer cylinder with pivot holes on the inner cylinder for receiving a conventional chuck key. In particular, the cylindrical members of both the Gebhardt and Pagano patents are integral components of the chuck assembly itself, without which the chuck jaw mechanism could not be operated. Neither member is adapted to be quickly removed from one drill chuck and readily transferred to another as the need arises. Consequently, neither member has found any use as a substitute for conventional chuck keys in every day home and industrial settings.

DISCLOSURE OF INVENTION

It is therefore the object of the present invention to provide a new and improved means for operating the jaws of a chuck.

It is an additional object of the present invention to provide a means for opening and closing the jaws of a drill chuck without requiring the use of a conventional chuck key.

It is yet an additional object of the present invention to provide a means which may be quickly and easily attached to an existing drill chuck without the need for modification of the chuck, which means will allow the operator to activate the jaw mechanism of the chuck with a bladed instrument such as a common screwdriver.

It is a further object of the present invention to provide a simple means which can easily and quickly be attached to an existing chuck and which will accommodate any of several bladed instruments of varying blade widths to allow the operator to open and close the jaws of the chuck without the use of a chuck key.

The present invention basically comprises a tubular chuck collar which fits over the inner cylinder of a chuck assembly in spaced relationship to the outer cylinder of the chuck assembly and is releasably secured to the inner cylinder by means of set screws which engage the conventional chuck key pivot holes disposed about the periphery of the inner cylinder. A plurality of teeth are circumferentially arranged around the base of the chuck collar to form a toothed track in opposing relationship to the conventional toothed track cut in the end of the chuck outer cylinder. The toothed track on the chuck collar includes several distinct sections, each of which is oriented at an incline relative to the toothed track on the outer cylinder. A bladed instrument such as a screwdriver may be inserted into the gap between the collar and the outer cylinder to simultaneously engage the teeth in both toothed tracks. When a screwdriver so inserted is twisted about its longitudinal axis, opposing torques are simultaneously applied to the collar and the outer cylinder. The inner cylinder, to which the collar is attached, is thereby caused to rotate relative to the outer cylinder, whereupon the jaw mechanism for opening or closing the chuck jaws is activated. The chuck collar also includes a slot formed in the side thereof such that the slot aligns with one of the chuck key pivot holes in the inner cylinder when the collar is fitted over the inner cylinder. The slot serves to receive a conventional chuck key, which may be inserted into the pivot hole and thereafter used to operate the chuck jaw mechanism in a conventional manner.

BRIEF DESCRIPTION OF DRAWINGS

The various features, objects and advantages of the present invention will become apparent from the following detailed description taken in conjunction with the accompanying drawings wherein:

FIG. 1 is a side elevational view of the chuck collar and that portion of a drill including the drill chuck assembly;

FIG. 2 is a perspective view of the chuck collar;

FIG. 3 is a rear elevational view of the chuck collar showing the sections of the toothed track on the collar;

FIG. 4A is a side elevational view of the chuck collar showing the positioning of the chuck key slot when the collar is attached to a chuck assembly;

BEST MODE FOR CARRYING OUT THE INVENTION

Figure 4B:
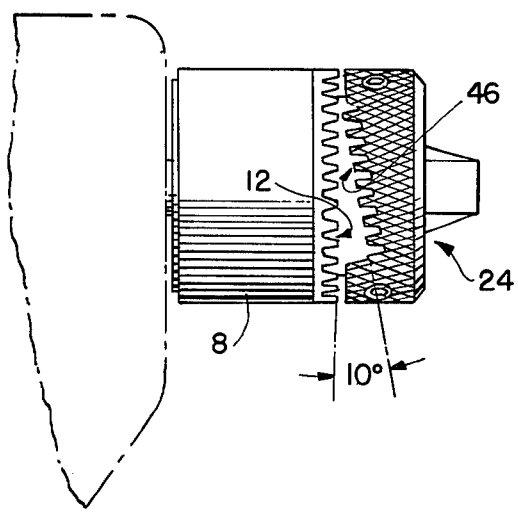
FIG. 4B is a side elevational view of the chuck collar as attached to a chuck assembly, showing the incline of the toothed track on the collar relative to the toothed track on the end of the chuck outer cylinder.

The conventional drill chuck indicated generally at 2 in FIG. 1 includes a set of jaws 4 mounted within an inner cylinder 6. An outer cylinder 8 with a plurality of teeth 10 circumferentially cut into one end thereof to form a toothed track 12 encircles the inner cylinder. Rotation of inner cylinder 6 relative to outer cylinder 8 operates a jaw mechanism (not shown) to open and close the chuck jaws 4. Three pivot holes 14 are arranged at 120° intervals around the periphery of the inner cylinder.

Traditionally, a conventional chuck key 16 containing pivot pin 18, bevel gear 20 and handle 22 is used to operate the chuck. The pivot pin 18 is inserted in one of the pivot holes 14 on the periphery of the inner cylinder, whereupon the teeth of bevel gear 20 are brought into registry with the teeth of toothed track 12. The turning of handle 22 causes the inner cylinder to rotate relative to the outer cylinder, thereby activating the jaw mechanism to open or close jaws 4 as desired.

The present improvement comprises a tubular-shaped chuck collar 24 which is fitted over the chuck inner cylinder 6 in spaced relationship to the outer cylinder 8. The inner diameter of the collar is only slightly larger than the outer diameter of inner cylinder 6, thereby insuring a snug fit between the collar 24 and the inner cylinder 6. The collar 24 may be constructed of lightweight metal or other suitably durable material. Knurls 25 formed on the exterior of the collar furnish a gripping surface to assist in fitting the collar to the inner cylinder and manipulating the collar after it has been so fitted.

The collar 24 contains threaded bores 26, 28 extending radially through the side of the collar to receive set screws 30, 32. The threaded bores are spaced 120° apart from each other in order to coincide with any two of the three pivot holes 14 disposed around the periphery of the inner cylinder. The set screws, which may be of the conventional allen head type, are of a length sufficient to allow beveled end portions 34, 36 thereof to engage the pivot holes, thus providing a convenient means for securing collar 24 to existing drill chucks without the need for modification of the chucks. When the screws 30, 32 are fully inserted within the threaded bores, the ends of the screws opposite beveled end portions 34, 36 are flush with the outer surface of collar 24 to prevent any annoying or dangerous protrusions.

The front of collar 24, which may be seen to better advantage in FIG. 2, contains a beveled lip 38 extending inwardly from the inner perimeter of the collar. Lip 38 rests on the beveled end 39 of inner cylinder 6 when collar 24 is fitted over inner cylinder 6, and is designed to support the collar on inner cylinder 6 in a manner such that threaded bores 26, 28 can be accurately aligned with pivot holes 14 while securing the collar to the inner cylinder.

A plurality of teeth 40 are circumferentially arranged around the base portion of collar 24 to form a toothed track 42. The teeth 40 are approximately the same size as the teeth 10 cut into the end of the outer cylinder 8. As may be seen in both FIG. 2 and FIG. 3, toothed track 42 is divided into three sections 44, 46 and 48. Sections 44 and 46 are separated by the portion of the collar 24 surrounding threaded bore 26. Sections 46 and 48 are separated by the portion of the collar 24 surrounding threaded bore 28. Sections 48 and 44 are separated by an open-ended chuck key slot 50 which is formed in the side of the collar at a point 120° apart from both threaded bores 26, 28 to permit alignment of the slot with the remaining pivot hole on the outer periphery of inner cylinder 6. Slot 50 is adapted to receive bevel gear 20 of conventional chuck key 16 as explained more fully hereinbelow.

When collar 24 is fitted over inner cylinder 6 of the chuck, teeth 40 in toothed track 42 of the collar are spaced apart from and positioned opposite teeth 10 in toothed track 12 of outer cylinder 8. As shown clearly in FIGS. 4A and 4B, each of the three sections 44, 46 and 48 of toothed track 42 is cut along an incline relative to toothed track 12. In the preferred embodiment, the angle of incline is set at 10° for each section, although some variation of this incline is allowable. Sections 44 and 48 on each side of chuck key slot 50 are inclined in opposite directions relative to one another as shown in detail in FIG. 4B. This is done to maintain the balance of the chuck assembly when the collar is attached to the inner cylinder, thus preventing the chuck from shimmying when the drill is operating at high speed.

INDUSTRIAL APPLICABILITY

Figure 5:
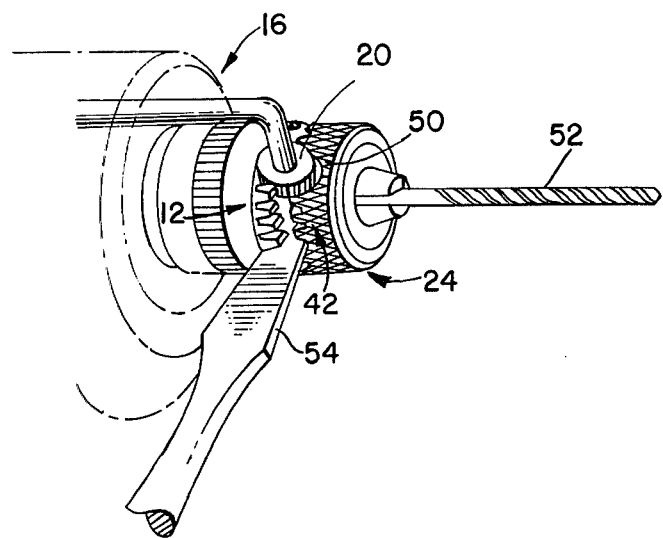
FIG. 5 is a perspective view showing the use of either a screwdriver or a conventional chuck key with the chuck collar of the present invention.

As previously discussed, chuck collar 24 is fitted over inner cylinder 6 of a drill chuck in spaced relationship to the outer cylinder 8 of the chuck and the threaded bores 26, 28 in the collar are aligned over pivot holes 14 spaced on the outer periphery of the inner cylinder. Set screws 30, 32 are then screwed into the threaded bores to firmly secure the collar 24 to the drill chuck. When the drill operator desires to open or close chuck jaws 4 to insert or change a drill bit 52 as shown in FIG. 5, a bladed tool 54 may be inserted into the gap between the opposed tracks of teeth 12 and 42 respectively formed on outer cylinder 8 and collar 24, thereby causing the tool to simultaneously engage teeth 10, 40 on both tracks 12, 42. The tool may be a screwdriver or any other instrument containing a flat blade shaped to fit into the grooves formed by the teeth. The bladed tool is then twisted about its longitudinal axis to simultaneously torque the collar and outer cylinder 8 in opposite directions. Because collar 24 is firmly secured to inner cylinder 6, the torque created by the twisting of the bladed tool causes both collar 24 and inner cylinder 6 to rotate relative to outer cylinder 8. In this manner, the jaw mechanism of the chuck is activated and chuck jaws 4 may be tightened to clamp drill bit 52 into place or loosened to remove the bit from the chuck.

The advantage of having inclined sections 44, 46 and 48 of toothed track 42 can now be readily seen. The variation in the gap between toothed track 12 on outer cylinder 8 and toothed track 42 on collar 24 as sections 44, 46 and 48 progress along their respective inclines permits the chuck collar to accommodate tools with varying blade widths. The likelihood that a drill operator in the typical home or industrial setting will have a suitable tool on hand to operate the drill chuck without the use of a conventional chuck key is accordingly greatly enhanced.

Of course, as again illustrated in FIG. 5, a conventional chuck key 60 can always be used to operate the chuck if desired. Pivot pin 18 of the chuck key is inserted into the inner cylinder pivot hole aligned with chuck key slot 50. The dimensions of the chuck key slot are sufficient to insure clearance between the bevel gear 20 of the chuck key and the sides of the chuck key slot, thus permitting the bevel gear to engage toothed track 12 on outer cylinder 8. Inner cylinder 6 can then be rotated relative to outer cylinder 8 in the conventional manner.

Only one embodiment of the invention has been shown and described in the specification. It is understood, however, that various changes and modifications in the form and details of the novel chuck collar illustrated above may be made by those skilled in the art without departing from the scope and spirit of the invention. It is therefore the intention of the inventor to be limited only by the following claims.

I claim:

1. Apparatus for operating a chuck assembly having an outer cylinder with a set of teeth circumferentially arranged around one end thereof, an inner cylinder rotatably mounted within the outer cylinder, the inner cylinder having at least one pivot hole formed therein adjacent the set of teeth on the outer cylinder, a jaw mechanism mounted within the inner cylinder and movable between fully open and fully closed positions upon relative rotation of the inner and the outer cylinders, and a torque applicator for providing relative rotation torque between the inner and the outer cylinders, the torque applicator having a pivot pin and a bevel gear which is brought into registry with the set of teeth on the outer cylinder when the pivot pin is inserted into the pivot hole, said apparatus comprising a chuck operating means releasably attachable to the inner cylinder of the chuck assembly for operating the jaw mechanism, said chuck operating means including an annular attachment member shaped to releasably fit over the inner cylinder, said annular attachment member having a plurality of teeth circumferentially arranged around one end thereof, said apparatus also comprising a securing means for fixing said annular attachment member simultaneously against either clockwise or counter-clockwise rotation relative to the inner cylinder and for spacing said annular attachment member from the outer cylinder in a position such that a bladed instrument may be used to simultaneously engage a tooth in said plurality of teeth on said annular attachment member and a tooth in the set of teeth on the outer cylinder to provide a torque for rotating both the inner cylinder and said annular attachment member relative to the outer cylinder when the bladed instrument is turned.

2. The apparatus as set forth in claim 1, wherein at least a portion of the exterior of said annular member is knurled to provide a gripping surface.

3. Apparatus for operating a chuck assembly having an outer cylinder with a set of teeth circumferentially arranged around one end thereof, an inner cylinder rotatably mounted within the outer cylinder, and a jaw mechanism mounted within the inner cylinder and movable between fully open and fully closed positions upon relative rotation of the inner and the outer cylinders, said apparatus comprising an annular member shaped to releasably fit over the inner cylinder of the chuck assembly, said annular member including a base portion around which a plurality of teeth are circumferentially arranged to form a toothed track, said toothed track having at least one helical section of teeth oriented at an incline relative to the set of teeth on the outer cylinder, said apparatus also comprising a securing means for releasably securing said annular member to the inner cylinder in a position relative to the outer cylinder such that any one of several bladed instruments of varying blade widths may be used to simultaneously engage at least one tooth in said toothed track formed around the base portion of said annular member and at least one tooth in the set of teeth on the outer cylinder to provide torque for rotating both the inner cylinder and said annular member relative to the outer cylinder when the bladed instrument is turned.

4. The apparatus as set forth in claim 3, wherein said toothed track formed around the base portion of said annular member is divided into three distinct helical sections of teeth, each said helical section being oriented at an incline relative to the set of teeth on the outer cylinder.

5. The apparatus as set forth in claim 4, wherein said helical sections of said toothed track are oriented at a 10° incline relative to the set of circumferentially arranged teeth on the outer cylinder.

6. Apparatus for operating a chuck assembly having an outer cylinder with a set of teeth circumferentially arranged arouhd one end thereof, an inner cylinder rotatably mounted within the outer cylinder, the inner cylinder having at least one chuck key pivot hole formed therein adjacent the set of teeth on the outer cylinder, a chuck key having a pivot pin and a bevel gear for engagement with the set of teeth on the outer cylinder when the pivot pin is inserted in the chuck key pivot hole, and a jaw mechanism mounted within the inner cylinder and movable between fully open and fully closed positions upon relative rotation of the inner and the outer cylinders, said apparatus comprising an annular member shaped to releasably fit over the inner cylinder of the chuck assembly, said annular member including a plurality of teeth circumferentially arranged around one end thereof, said annular member also including a receiving means shaped to receive the bevel gear of the chuck key such that said receiving means may be brought into alignment with the chuck key pivot hole in the inner cylinder to receive the chuck key bevel gear which engages the set of teeth on the outer cylinder when the chuck key pivot pin formed on one end of the bevel gear is inserted into the chuck key pivot hole aligned with said receiving means.

7. An apparatus as set forth in claim 6, wherein said receiving means includes a portion of the side of said annular member having a slot formed therein, said slot being brought into alignment with the chuck key pivot hole to receive the chuck key bevel gear when the chuck key pivot pin is inserted in the pivot hole.

8. A chuck assembly including:
(a) an outer cylinder with a set of teeth circumferentially arranged around one end thereof;
(b) an inner cylinder rotatably mounted within said outer cylinder, said inner cylinder having at least one chuck key pivot hole formed therein adjacent the set of teeth on said outer cylinder;
(c) a jaw mechanism mounted within said inner cylinder and movable between fully open and fully closed positions upon relative rotation of said inner and outer cylinders;
(d) a chuck key means for providing torque to rotate said inner cylinder relative to said outer cylinder, said chuck key means including a pivot pin and a bevel gear which may be brought into registry with said set of teeth on said outer cylinder by inserting said pivot pin into one of said chuck key pivot holes; and
(e) an annular member shaped to releasably fit over said inner cylinder, said annular member having a plurality of teeth circumferentially arranged around one and thereof and a securing means for fixing said annular member simultaneously against either clockwise or counterclockwise rotation relative to said inner cylinder and for spacing said annular member from said outer cylinder in a position such that a bladed instrument may be used to simultaneously engage the teeth in said plurality of teeth on said annular member and the teeth in said set of teeth on said outer cylinder to provide a torque for rotating both said inner cylinder and said annular member relative to said outer cylinder when the bladed instrument is turned.

9. Apparatus for operating a chuck assembly having an outer cylinder with a set of teeth circumferentially arranged around one end thereof, an inner cylinder rotatably mounted within the outer cylinder, the inner cylinder having at least one pivot hole formed therein adjacent the set of teeth of the outer cylinder, a jaw mechanism mounted within the inner cylinder and movable between fully open and fully closed positions upon relative rotation of the inner and the outer cylinders, and a torque applicator for providing relative rotational torque between the inner and the outer cylinders, the torque applicator having a pivot pin and a bevel gear which is brought into registry with the set of teeth on said outer cylinder when the pivot pin is inserted into the pivot hole, said apparatus comprising an annular member shaped to releasably fit over the inner cylinder of the chuck assembly, said annular member including a plurality of teeth circumferentially arranged around one end thereof, said annular member further including at least one threaded bore disposed therein, said apparatus also comprising a securing means for releasably securing said annular member to the inner cylinder in a position relative to the outer cylinder such that a bladed instrument may be used to simultaneously engage a tooth in said plurality of teeth on said annular member and a tooth in the set of teeth on the outer cylinder to provide a torque for rotating the inner cylinder relative to the outer cylinder when the bladed instrument is turned, said securing means including a set screw which is threaded into said threaded bore to releasably secure said annular member to the inner cylinder.

10. The apparatus as set forth in claim 9, wherein said threaded bore is positioned on said annular member in a manner such that said threaded bore may be brought into alignment with the pivot hole contained in the inner cylinder to allow said set screw to engage the pivot hole when said set screw is threaded into said threaded bore.

11. The apparatus as set forth in claim 10, wherein said annular member contains a plurality of threaded bores spaced 120° apart from each other.

12. Apparatus for operating a chuck assembly having an outer cylinder with a set of teeth circumferentially arranged around one end thereof, an inner cylinder rotatably mounted within the outer cylinder, the inner cylinder having at least one pivot hole formed therein adjacent the set of teeth on the outer cylinder, a jaw mechanism mounted within the inner cylinder and movable between fully open and fully closed positions upon relative rotation of the inner and the outer cylinders, and a torque applicator for providing relative rotational torque between the inner and the outer cylinders, the torque applicator having a pivot pin and a bevel gear which is brought into registry with the set of teeth on said outer cylinder when the pivot pin is inserted into the pivot hole, said apparatus comprising an annular member shaped to releasably fit over the inner cylinder of the chuck assembly, said annular member including a plurality of teeth circumferentially arranged around one end thereof, said plurality of teeth forming a toothed track, said toothed track having at least one helical section of teeth oriented at an incline relative to the set of teeth on the outer cylinder, said apparatus also comprising a securing means for releasably securing said annular member to the inner cylinder in a position relative to the outer cylinder such that a bladed instrument may be used to simultaneously engage a tooth in said plurality of teeth on said annular member and a tooth in the set of teeth on the outer cylinder to provide a torque for rotating the inner cylinder relative to the outer cylinder when the bladed instrument is turned.

13. The apparatus as set forth in claim 12, wherein said toothed track formed on said annular member is divided into three distinct helical sections of teeth, each said helical section being oriented at an incline relative to the set of teeth on the outer cylinder.

14. The apparatus as set forth in claim 13, wherein said helical sections of said toothed track are oriented at a 10° incline relative to the set of teeth on the outer cylinder.

15. Apparatus for operating a chuck assembly having an outer cylinder with a set of teeth circumferentially arranged around one end thereof, an inner cylinder rotatably mounted within the outer cylinder, the inner cylinder having at least one pivot hole formed therein adjacent the set of teeth on the outer cylinder, a jaw mechanism mounted within the inner cylinder and movable between fully open and fully closed positions upon relative rotation of the inner and the outer cylinders, and a torque applicator for providing relative rotational torque between the inner and the outer cylinders, the torque applicator having a pivot pin and a bevel gear which is brought into registry with the set of teeth on said outer cylinder when the pivot pin is inserted into the pivot hole, said apparatus comprising an annular member shaped to releasably fit over the inner cylinder of the chuck assembly, said annular member including a plurality of teeth circumferentially arranged around one end thereof, said plurality of teeth forming a toothed track, said toothed track having three distinct helical sections of teeth, each said helical section being oriented at an incline relative to the set of teeth on the outer cylinder, said annular member further including a slot formed on one side thereof, said slot being positioned on said annular member in a manner such that said slot may be brought into alignment with a pivot hole contained in the inner cylinder, said slot operating to receive the bevel gear which engages the set of teeth on the outer cylinder when the pivot pin on the end of the torque applicator is inserted into the pivot hole aligned with said slot, said apparatus also comprising a securing means for releasably securing said annular member to the inner cylinder in a position relative to the outer cylinder such that a bladed instrument may be used to simultaneously engage a tooth in said plurality of teeth on said annular member and a tooth in the set of teeth on the outer cylinder to provide a torque for rotating the inner cylinder relative to the outer cylinder when the bladed instrument is turned.

16. The apparatus as set forth in claim 15, wherein one section of said toothed track formed on said annular member is positioned on one side of said slot and is inclined in a first direction relative to the set of teeth on the outer cylinder and a second section of said toothed track formed on said annular member is positioned on the other side of said slot and is inclined in a second direction opposing said first direction relative to the set of teeth on the outer cylinder to prevent the weight of said annular member from unbalancing the chuck assembly when said annular member is attached thereto.

17. A chuck assembly including:
(a) an outer cylinder with a set of teeth circumferentially arranged around one end thereof;
(b) an inner cylinder rotatably mounted within said outer cylinder;
(c) a jaw mechanism mounted within said inner cylinder and movable between fully open and fully closed positions upon relative rotation of said inner and outer cylinders; and
(d) an annular member integrally attached to said inner cylinder in a position spaced from said outer cylinder and simultaneously fixed against either clockwise or counterclockwise rotation relative to said inner cylinder, said annular member having a plurality of teeth circumferentially arranged around one end thereof such that a bladed instrument may be used to engage the teeth in said plurality of teeth on said annular member and the teeth in said set of teeth on said outer cylinder to provide a torque for rotating both said inner cylinder and said annular member relative to said outer cylinder when the bladed instrument is turned.

18. A chuck assembly for use with a chuck key having a pivot pin, said chuck assembly including:
(a) a first cylinder with a set of teeth circumferentially arranged around one end thereof;
(b) a second cylinder rotatably mounted within said first cylinder, said second cylinder having at least one chuck key pivot pin receiving means formed therein adjacent the set of teeth on said first cylinder to receive the pivot pin of the chuck key;
(c) a jaw mechanism connected to said cylinders and movable between fully open and fully closed positions upon relative rotation of said first and second cylinders; and
(d) an annular member integrally attached to said second cylinder in a position spaced from said first cylinder and fixed simultaneously against either clockwise or counterclockwise rotation relative to said second cylinder, said annular member having a plurality of teeth circumferentially arranged around one end thereof such that a bladed instrument may be used to engage the teeth in said plurality of teeth on said annular member and the teeth in said set of teeth on said first cylinder to provide a torque for rotating both said second cylinder and said annular member relative to said first cylinder when the bladed instrument is turned.

* * * * *